United States Patent [19]
Nguyen et al.

[11] Patent Number: 6,103,176
[45] Date of Patent: *Aug. 15, 2000

[54] STEREOLITHOGRAPHIC METHOD AND APPARATUS FOR PRODUCTION OF THREE DIMENSIONAL OBJECTS USING RECOATING PARAMETERS FOR GROUPS OF LAYERS

[75] Inventors: Hop D. Nguyen, Quartz Hill; Chris R. Manners, Moorpark, both of Calif.

[73] Assignee: 3D Systems, Inc., Valencia, Calif.

[*] Notice: This patent is subject to a terminal disclaimer.

[21] Appl. No.: 09/248,351

[22] Filed: Feb. 8, 1999

Related U.S. Application Data

[63] Continuation-in-part of application No. 08/920,428, Aug. 29, 1997, Pat. No. 5,902,538.

[51] Int. Cl.$^7$ .............................. B29C 35/08; B29C 41/02
[52] U.S. Cl. ...................... 264/401; 264/308; 425/174.4; 425/375; 700/120
[58] Field of Search .................................. 264/308, 401; 425/174.4, 375; 700/120

[56] References Cited

U.S. PATENT DOCUMENTS

| | | |
|---|---|---|
| 4,575,330 | 3/1986 | Hull . |
| 4,752,352 | 6/1988 | Feygin . |
| 4,863,538 | 9/1989 | Deckard . |
| 4,999,143 | 3/1991 | Hull et al. . |
| 5,015,312 | 5/1991 | Kinzie . |
| 5,058,988 | 10/1991 | Spence . |

(List continued on next page.)

FOREIGN PATENT DOCUMENTS

| | | |
|---|---|---|
| WO 95/18009 | 7/1995 | WIPO . |
| WO 96/12607 | 5/1996 | WIPO . |
| WO 96/12608 | 5/1996 | WIPO . |
| WO 96/12609 | 5/1996 | WIPO . |
| WO 96/12610 | 5/1996 | WIPO . |

OTHER PUBLICATIONS

Jacobs, "Rapid Prototyping & Manufacturing: Fundamentals of StereoLithography," Society of Manufacturing Engineers, 1992.
Jacobs, "Stereolithography and other RP&M Technologies," Society of Manufacturing Engineers, 1996.
U.S. Patent Application No. 08/722,335, filed Sep. 27, 1996 by Leyden et al. (now abandoned).
U.S. Patent Application No. 08/855,125, filed May 13, 1997 by Nguyen, et al.

(List continued on next page.)

*Primary Examiner*—Leo B. Tentoni
*Attorney, Agent, or Firm*—Ralph D'Alessandro; Dennis Smalley

[57] ABSTRACT

A rapid prototyping and manufacturing (e.g. stereolithography) method and apparatus for making three-dimensional objects with enhanced control of coating parameters used when forming layers of liquid or other fluid-like material in preparation for forming laminae of the object. The each lamina of the object is treated as either a primary laminae or secondary laminae. Only minority portions of the secondary layers are solidified when their associated layers are formed. Primary laminae are solidified in majority portions, along with previously unsolidified portions of secondary lamina, when their associated layers are formed. Recoating parameters are supplied for groups of primary layers and secondary layers such that coating formation may be controlled differently for primary layers and for secondary layers. Coating control for secondary layers may be based on the position of individual secondary layers, or sets of secondary layers, relative to the primary layers. The enhanced control leads to (1) more accurate layer formation, and/or (2) faster layer formation times for groups of successive layers.

17 Claims, 6 Drawing Sheets

U.S. PATENT DOCUMENTS

| | | |
|---|---|---|
| 5,059,021 | 10/1991 | Spence et al. . |
| 5,076,974 | 12/1991 | Modrek et al. . |
| 5,104,592 | 4/1992 | Hull et al. . |
| 5,121,329 | 6/1992 | Crump . |
| 5,123,734 | 6/1992 | Spence et al. . |
| 5,133,987 | 7/1992 | Spence et al. . |
| 5,141,680 | 8/1992 | Almquist et al. . |
| 5,143,663 | 9/1992 | Leyden et al. . |
| 5,174,931 | 12/1992 | Almquist et al. . |
| 5,182,056 | 1/1993 | Spence et al. . |
| 5,182,715 | 1/1993 | Vorgitch et al. . |
| 5,184,307 | 2/1993 | Hull et al. . |
| 5,192,469 | 3/1993 | Hull et al. . |
| 5,192,559 | 3/1993 | Hull et al. . |
| 5,204,055 | 4/1993 | Sachs et al. . |
| 5,209,878 | 5/1993 | Smalley et al. . |
| 5,234,636 | 8/1993 | Hull et al. . |
| 5,238,639 | 8/1993 | Vinson et al. . |
| 5,256,340 | 10/1993 | Allison et al. . |
| 5,321,622 | 6/1994 | Snead et al. . |
| 5,597,520 | 1/1997 | Smalley et al. . |
| 5,840,239 | 11/1998 | Partanen et al. . |
| 5,902,537 | 5/1999 | Almquist et al. . |
| 5,902,538 | 5/1999 | Kruger et al. ............... 264/401 |
| 5,943,235 | 8/1999 | Earl et al. . |
| 5,945,058 | 8/1999 | Manners et al. . |
| 6,001,297 | 12/1999 | Partanen et al. . |

OTHER PUBLICATIONS

U.S. Patent Application No. 09/061,796, filed Apr. 16, 1998 by Wu, et al.

U.S. Patent Application No. 09/154,967, filed Sep. 17, 1998 by Nguyen, et al.

U.S Patent Application No. 09/246,416, filed Feb. 8, 1999 by Bishop, et al.

U.S. Patent Application No. 09/246,504, filed Feb. 8, 1999 by Guertin, et al.

U.S. Patent Application No. 09/247,113, filed Feb. 8, 1999 by Chari, et al.

U.S. Patent Application No. 09/247,119, filed Feb. 8, 1999 by Kulkarni, et al.

U.S. Patent Application No. 09/247,120, filed Feb. 8, 1999 by Everett, et al.

U.S. Patent Application No. 09/248,352, filed Feb. 8, 1999 by Manners, et al.

U.S. Patent Application No. 09/484,984, filed Jan. 18, 2000 by Earl, et al.

STEREOLITHOGRAPHIC METHOD AND APPARATUS FOR PRODUCTION OF THREE DIMENSIONAL OBJECTS USING RECOATING PARAMETERS FOR GROUPS OF LAYERS

REFERENCE TO PRIORITY APPLICATION

This application is a continuation-in-part application of U.S. patent application No. 08/920,438, filed Aug. 29, 1997, now U.S. Pat. No. 5,902,538. The full disclosure of this referenced application is incorporated herein by reference as if set forth in full.

FIELD OF THE INVENTION

This invention relates to the formation of three-dimensional objects using a Rapid Prototyping and Manufacturing (RP&M) technique (e.g. stereolithography). The invention more particularly relates to the formation of three-dimensional objects using stereolithography with recoating parameters that are varied within a group of layers but are repeated for in successive groups.

BACKGROUND OF THE INVENTION

1. Related Art

Rapid Prototyping and Manufacturing (RP&M) is the name given to a field of technologies that can be used to form three-dimensional objects rapidly and automatically from three-dimensional computer data representing the objects. RP&M can be considered to include three classes of technologies: (1) Stereolithography, (2) Selective Deposition Modeling, and (3) Laminated Object Manufacturing.

The stereolithography class of technologies create three-dimensional objects based on the successive formation of layers of a fluid-like material adjacent to previously formed layers of material and the selective solidification of those layers according to cross-sectional data representing successive slices of the three-dimensional object in order to form and adhere laminae (i.e. solidified layers). One specific stereolithography technology is known simply as stereolithography and uses a liquid material that is selectively solidified by exposing it to prescribed stimulation. The liquid material is typically a photopolymer and the prescribed stimulation is typically visible or ultraviolet electromagnetic radiation. The radiation is typically produced by a laser though other sources of radiation are possible such as arc lamps, resistive lamps, and the like. Exposure may occur by scanning a beam or by controlling a flood exposure by use of a light valve that selectively transmits or reflects the radiation. Liquid-based stereolithography is disclosed in various patents, applications, and publications of which a number are briefly described in the Related Applications section hereafter.

Another stereolithography technology is known as Selective Laser Sintering (SLS). SLS is based on the selective solidification of layers of a powdered material by exposing the layers to infrared electromagnetic radiation to sinter or fuse the powder particles. SLS is described in U.S. Pat. No. 4,863,538, issued Sep. 5, 1989, to Deckard. A third technology is known as Three Dimensional Printing (3DP). 3DP is based on the selective solidification of layers of a powdered material which are solidified by the selective deposition of a binder thereon. 3DP is described in U.S. Pat. No. 5,204,055, issued Apr. 20, 1993, to Sachs.

Selective Deposition Modeling, SDM, involves the buildup of three-dimensional objects by selectively depositing solidifiable material on a lamina-by-lamina basis according to cross-sectional data representing slices of the three-dimensional object. One such technique is called Fused Deposition Modeling, FDM, and involves the extrusion of streams of heated, flowable material which solidify as they are dispensed onto the previously formed laminae of the object. FDM is described in U.S. Pat. No. 5,121,329, issued Jun. 9, 1992, to Crump. Another technique is called Ballistic Particle Manufacturing, BPM, which uses a 5-axis, ink-jet dispenser to direct particles of a material onto previously solidified layers of the object. BPM is described in PCT publication numbers WO 96-1260,7, published May 2, 1996, by Brown; WO 96-12608, published May 2, 1996, by Brown; WO 96-12609, published May 2,1996, by Menhennett; and WO 96-12610, published May 2,1996, by Menhennett. A third technique is called Multijet Modeling, MJM, and involves the selective deposition of droplets of material from multiple ink jet orifices to speed the building process. MJM is described in U.S. Pat. No. 5,943,235 filed Sep. 27, 1996 and issued Aug. 24, 1999 to Earl et al. in U.S. patent application No. 08/722,335, filed Sep. 27, 1996, by Leyden et al. now abandoned (both assigned to 3D Systems, Inc. as is the instant application).

Laminated Object Manufacturing, LOM, techniques involve the formation of three-dimensional objects by the stacking, adhering, and selective cutting of sheets of material, in a selected order, according to the cross-sectional data representing the three-dimensional object to be formed. LOM is described in U.S. Pat. Nos. 4,752,352, issued Jun. 21, 1988, to Feygin, 5,015,312, issued May 14, 1991, to Kinzie, and 5,192,559, issued Mar. 9, 1993, to Hull et al.; and in PCT Publication No. WO 95-18009, published Jul. 6, 1995, by Morita.

The techniques of the instant invention are directed primarily to liquid-based stereolithography object formation, and more particularly to layer formation when exposure techniques are employed that leave some object portions unexposed on some layers and then expose those object portions in association with a subsequent layer. A need exists in the art for improved techniques for forming coatings of material in a more accurate and/or timely manner.

2. Other Related Patents and Applications

The patents, applications, and publications mentioned above and hereafter are all incorporated by reference herein as if set forth in full. Table 1 provides a listing of patents and applications co-owned by the assignee of the instant application. A brief description of subject matter found in each patent and application is included in the table to aid the reader in finding specific types of teachings. It is not intended that the incorporation of subject matter be limited to those topics specifically indicated, but instead the incorporation is to include all subject matter found in these applications and patents. The teachings in these incorporated references can be combined with the teachings of the instant application in many ways. For example, the references directed to various data manipulation techniques may be combined with the teachings herein to derive even more useful, modified object data that can be used to more accurately and/or efficiently form objects. As another example, the various apparatus configurations disclosed in these references may be used in conjunction with the novel features of the instant invention.

TABLE 1

Related Patents and Applications

| Patent No.<br>Issue Date<br>Application No.<br>Filing Date | Inventor | Subject |
|---|---|---|
| 4,575,330<br>Mar 11, 1986<br>06/638,905<br>Aug 8, 1984 | Hull | Discloses fundamental elements of stereolithography. |
| 4,999,143<br>Mar 12, 1991<br>07/182,801<br>Apr 18, 1988 | Hull, et at. | Discloses various removable support structures applicable to stereolithography. |
| 5,058,988<br>Oct 22, 1991<br>07/268,816<br>Nov 8, 1988 | Spence | Discloses the application of beam profiting techniques useful in stereolithography for determining cure depth and scanning velocity, etc. |
| 5,059,021<br>Oct 22, 1991<br>07/268,907<br>Nov 8, 1988 | Spence, et al. | Discloses the utilization of drift correction techniques for eliminating errors in beam positioning resulting from instabilities in the beam scanning system |
| 5,076,974<br>Dec 31, 1991<br>07/268,429<br>Nov 8, 1988 | Modrek, et at | Discloses techniques for post processing objects formed by stereolithography. In particular exposure techniques are described that complete the solidification of the building material. Other post processing steps are also disclosed such as steps of fitting in or sanding off surface discontinuities. |
| 5,104,592<br>Apr 14, 1992<br>07/339,246<br>Apr 17, 1989 | Hull | Discloses various techniques for reducing distortion, and particularly curt type distortion, in objects being formed by stereolithography. |
| 5,123,734<br>Jun 23, 1992<br>07/268,837<br>Nov 8, 1988 | Spence, et at. | Discloses techniques for calibrating a scanning system. In particular techniques for mapping from rotational mirror coordinates to planar target surface coordinates are disclosed |
| 5,133,987<br>Jul 28, 1992<br>07/427,885<br>Oct 27, 1989 | Spence, et al. | Discloses the use of a stationary mirror located on an optical path between the scanning mirrors and the target surface to fold the optical path in a stereolithography system. |
| 5,141,680<br>Aug 25, 1992<br>07/592,5599<br>Oct 4, 1990 | Almquist, et al. | Discloses various techniques for selectively dispensing a material to build up three-dimensional objects. |
| 5,143,663<br>Sep 1, 1992<br>07/365,444<br>Jun 12, 1989 | Leyden, et al. | Discloses a combined stereolithography system for building and cleaning objects. |
| 5,174,931<br>Dec 29, 1992<br>07/515,479<br>Apr 27, 1990 | Almquist, et al. | Discloses various doctor blade configurations for use in forming coatings of medium adjacent to previously solidified laminae. |
| 5,182,056<br>Jan 26, 1993<br>07/429,911<br>Oct 27, 1989 | Spence, et al. | Discloses the use of multiple wavelengths in the exposure of a stereolithographic medium. |
| 5,182,715<br>Jan 26, 1993<br>07/824,819<br>Jan 22, 1992 | Vorgitch, et al. | Discloses various elements of a large stereolithographic system. |
| 5,184,307<br>Feb 2, 1993<br>07/331,644<br>Mar 31, 1989 | Hull, et al. | Discloses a program called Slice and various techniques for converting three-dimensional object data into data descriptive of cross-sections. Disclosed techniques include line width compensation techniques (erosion routines), and object sizing techniques. The application giving rise to this patent included a number of appendices that provide further details regarding stereolithography methods and systems. |
| 5,192,469<br>Mar 9, 1993<br>07/606,802<br>Oct 30, 1990 | Hull, et at. | Discloses various techniques for forming three-dimensional object from sheet material by selectively cutting out and adhering laminae. |
| 5,209,878<br>May 11, 1993<br>07/605,979<br>Oct 30, 1990 | Smalley, et al. | Discloses various techniques for reducing surface discontinuities between successive cross-sections resulting from a layer-by-layer building technique. Disclosed techniques include use of fill layers and meniscus smoothing. |

TABLE 1-continued

Related Patents and Applications

| Patent No.<br>Issue Date<br>Application No.<br>Filing Date | Inventor | Subject |
|---|---|---|
| 5,234,636<br>Aug 10, 1993<br>07/929,463<br>Aug 13, 1992 | Hull, et al. | Discloses techniques for reducing surface discontinuities by coating a formed object with a material, heating the material to cause it to become flowable, and allowing surface tension to smooth the coating over the object surface. |
| 5,238,639<br>Aug 24, 1993<br>07/939,549<br>Mar 31, 1992 | Vinson, et al. | Discloses a technique for minimizing curl distortion by balancing upward curl to downward curl. |
| 5,256,340<br>Oct 26, 1993<br>07/906,207<br>Jun 25, 1992<br>and<br>08/766,956<br>Dec 16, 1996 | Allison, et al. | Discloses various build/exposure styles for forming objects including various techniques for reducing object distortion. Disclosed techniques include: (1) building hollow, partially hollow, and solid objects, (2) achieving more uniform cure depth, (3) exposing layers as a series of separated tiles or bullets, (4) using alternate sequencing exposure patterns from layer to layer, (5) using staggered or offset vectors from layer to layer, and (6) using one or more overlapping exposure patterns per layer. |
| 5,321,622<br>Jun 14, 1994<br>07/606,191<br>Oct 30, 1990 | Snead, et al. | Discloses a computer program known as CSlice which is used to convert three-dimensional object data into cross-sectional data. Disclosed techniques include the use of various Boolean operations in stereolithography. |
| 5,597,520<br>Jan 28, 1997<br>08/233,027<br>Apr 25, 1994<br>and<br>08/428,951<br>Apr 25, 1995 | Smalley, et al. | Discloses various exposure techniques for enhancing object formation accuracy. Disclosed techniques address formation of high resolution objects from building materials that have a Minimum Solidification Depth greater than one layer thickness and/or a Minimum Recoating Depth greater than the desired object resolution. |
| 08/722,335<br>Sep 27, 1996<br>now abandoned | Thayer, et al. | Discloses build and support styles for use in a Multi-Jet Modeling selective deposition modeling system. |
| 5,943,235<br>Aug 24, 1999<br>08/722,326<br>Sep 27, 1996 | Earl, et al. | Discloses data manipulation and system control techniques for use in a Multi-Jet Modeling selective deposition modeling system. |
| 5,902,537<br>May 11, 1999<br>08/790,005<br>Jan 28, 1997 | Almquist, et al. | Discloses various recoating techniques for use in stereolithography. Disclosed techniques include 1) an inkjet dispensing device, 2) a fling recoater, 3) a vacuum applicator, 4) a stream recoater, 5) a counter rotating roller recoater, and 6) a technique for deriving sweep extents. |
| 5,840,239<br>Nov 24, 1998<br>08/792,347<br>Jan 31, 1997 | Partanen, et al. | Discloses the application of solid-state lasers to stereolithography. |
| 6,001,297<br>Dec 14, 1999<br>08/847,855<br>Apr 28, 1997 | Partanen, et al. | Discloses a stereolithographic technique using a pulsed radiation source for solidifying layers of building material and in particular the ability to limit pulse firing locations to only selected target locations on a surface of the medium. |
| 08/855,125<br>May 13, 1997 | Nguyen, et al. | Discloses techniques for interpolating originally supplied cross-sectional data descriptive of a three-dimensional object to produce modified data descriptive of the three-dimensional object including data descriptive of intermediate regions between the originally supplied cross-sections of data. |
| 5,945,058<br>Aug 31, 1999<br>08/854,950<br>May 13, 1997 | Manners, et al. | Discloses techniques for identifying features of partially formed objects. Identifiable features include trapped volumes, effective trapped volumes, and solid features of a specified size. The identified regions can be used in automatically specifying recoating parameters and or exposure parameters. |
| 5,902,538<br>May 11, 1999<br>08/920,428<br>Aug 29, 1997 | Kruger, et al. | Discloses simplified techniques for making high-resolution objects utilizing low-resolution materials that are limited by their inability to reliably form coatings of a desired thickness due to a Minimum Recoating Depth (MRD) limitation. Data manipulation techniques define layers as primary or secondary. Recoating techniques are described which can be used when the thickness between consecutive layers is less than a leading edge bulge phenomena. |
| 09/061,796<br>Apr 16, 1998 | Wu, et al. | Discloses use of frequency converted solid state lasers in stereolithography. |
| 09/154,967<br>Sep 17, 1998 | Nguyen, et al. | Discloses techniques for stereolithographic recoating using a sweeping recoating device that pause and/or slows down over laminae that are being coated over. |

TABLE 1-continued

Related Patents and Applications

| Patent No. Issue Date Application No. Filing Date | Inventor | Subject |
|---|---|---|
| 09/484,984 Jan 18, 2000 | Earl, et al. | Entitled "Method and Apparatus for Forming Three-Dimensional Objects Using Line Width Compensation with Small Feature Retention." Discloses techniques for forming objects while compensating for solidification width induced in a building material by a beam of prescribed stimulation. |
| 09/246,504 Feb 8, 1999 | Guertin, et al. | Entitled Method and Apparatus for Stereolithographically Forming Three Dimensional Objects with Reduced Distortion." Discloses techniques for forming objects wherein a delay is made to occur between successive exposures of a selected region of a layer. |
| 09/248,352 Feb 8, 1999 | Manners, et al. | Entitled "Stereolithographic Method and Apparatus for production of Three Dimensional Objects using Multiple Beams of different Diameters. Discloses stereolithographic portions of lamina may be formed with a larger beam and which should be formed using a smaller beam. |
| 09/246,416 Feb 8, 1999 | Bishop, et al. | Entitled "Rapid Prototyping Apparatus With Enhanced Thermal and/or Vibrational Stability for Production of Three Dimensional Objects." Discloses an improved Stereolithographic apparatus structure for isolating vibration and/or extraneous heat producing components from other thermal and vibration sensitive components. |
| 03/248,113 Feb 8, 1999 | Chari, et al. | Entitled "Stereolithographic Method and Apparatus for Production of Three Dimensional Objects with Enhanced Thermal Control of the Build environment." Discloses improved stereolithographic techniques for maintaining build chamber temperature at a desired level. The techniques include varying heat production based on the difference between a detected temperature and the desired temperature. |
| 09/247,120 Feb 8, 1999 | Everett, et al. | Entitled "Stereolithographic Method and Apparatus for production of Three Dimensional Objects including Enhanced Control of Prescribed Stimulation Production." Discloses techniques forming objects using varying production of prescribed stimulation (e.g. UV radiation)and enhanced scanning control. Production is reduced or eliminated during non-exposure periods (e.g. recoating, z-wait, and pre-dip defray). Production is set to a desired level based on the type of exposure that is desired. Scanning speed is set based on a number of criteria. Transition between successive exposure vectors may be made with multiple intervening non-exposure vectors. The laser power is set using an AOM in combination with a temporary detection of beam power. |
| 09/247,110 Feb 8, 1999 | Kulkarni, et al. | Entitled "Stereolithographic Method and Apparatus for Production of Three Dimensional Objects Including Enhanced Control of Prescribed Stimulation Production." Discloses techniques for forming objects using a simplified data preparation process. Selection of the various parameter styles needed to form an object is reduced to answering several questions from lists of possible choices. |

The following two books are also incorporated by reference herein as if set forth in full: (1) *Rapid Prototypinq and Manufacturing: Fundamentals of Stereolithography*, by Paul F. Jacobs; published by the *Society of Manufacturing Engineers*, Dearborn Mich.; 1992; and (2) *Stereolithography and other RP&M Technologies: from Rapid Prototyping to Rapid Tooling*; by Paul F. Jacobs; published by the *Society of Manufacturing Engineers*, Dearborn Mich.; 1996.

SUMMARY OF THE INVENTION

It is an object of the present invention to more rapidly form three-dimensional objects by reducing the time spent in forming coatings of material.

It is a second object of the present invention to form improved coatings of building material.

It is a further aspect of the present invention to pursue the above objects separately and in various combinations.

A first aspect of the invention is to provide a method of forming a three-dimensional object from a plurality of adhered laminae, including (1) forming successive layers of material adjacent to any last formed layers of material in preparation for forming subsequent laminae of the object, some of the successive layers being primary layers spaced one from the other by one or more secondary layers positioned intermediate thereto; (2) defining at least first and second groups of layers, wherein the first group comprises a plurality of primary layers and the second group comprises one or more secondary layers located between the pair of successive primary layers in the first group; (3) selectively exposing the primary layers to form at least majority portions of primary laminae in association therewith and to form at least portions of the secondary laminae; and (4) selectively exposing the secondary layers to form at least minority portions of the secondary laminae in association therewith. The exposure of the primary layers and secondary layers results in adhesion of laminae to previously formed laminae so as to form the object from a plurality of adhered laminae. The formation of the first group of layers is controlled by a first set of recoating parameters and the formation of the second group of layers is controlled by a second set of recoating parameters that is different from the first set.

A second aspect of the inventions provides a method of forming a three-dimensional object from a plurality of adhered laminae, including a number of elements: (1) defining a number S of successive layers as a set; (2) defining a plurality of set of layers; (3) defining a plurality of groups of layers, wherein the groups contain one or more layers from each of the plurality of sets; (4) associating recoating parameters with each of the defined groups; (5) forming successive layers of material adjacent to any last formed layers of material in preparation for forming subsequent laminae of the object, wherein the recoating parameters utilized for forming a particular layer are dictated by recoating parameters specified for the group that contains the specific layer; (5) selectively exposing the layers to form at least portions of the lamina associated therewith to form the object from a plurality of adhered laminae.

A third aspect of the invention is to provide an apparatus for forming a three-dimensional object from a plurality of adhered laminae, including (1) means for forming successive layers of material adjacent to any previously formed layers of material in preparation for forming subsequent laminae of the object, some of the successive layers being primary layers spaced one from the other by one or more secondary layers positioned intermediate thereto; (2) means for defining at least first and second groups of layers, wherein the first group comprises a plurality of primary layers and the second group comprises one or more secondary layers located between successive pairs of primary layers; (3) means for selectively exposing the primary layers to form at least majority portions of primary laminae in association therewith and to form at least portions of the secondary laminae; and (4) means for selectively exposing the secondary layers to form at least minority portions of the secondary laminae in association therewith. The exposure of the primary layers and secondary layers results in adhesion of laminae to previously formed laminae so as to form the object from a plurality of adhered laminae. The means for forming forms the first group of layers under the control of a first set of recoating parameters and forms the second group of layers under the control of a second set of recoating parameters that is different from the first set.

A fourth aspect of the invention is to provide an apparatus for forming a three-dimensional object from a plurality of adhered laminae, including: (1) a coating system for forming successive layers of material adjacent to any previously formed layers of material in preparation for forming subsequent laminae of the object, some of the successive layers being primary layers spaced one from the other by one or more secondary layers positioned intermediate thereto; (2) a computer programmed to define at least first and second groups of layers, wherein the first group comprises a plurality of primary layers and the second group comprises one or more secondary layers located between pairs of successive primary layers; (3) an exposure system for selectively exposing the layers of material including exposing (A) the primary layers to form at least majority portions of primary laminae in association therewith and to form at least portions of the secondary laminae, and (B) the secondary layers to form at least minority portions of the secondary laminae in association therewith. The exposure of the primary layers and secondary layers results in adhesion of laminae to previously formed laminae so as to form the object from a plurality of adhered laminae. The wherein the coating system forms the first group of layers under the control of a first set of recoating parameters and forms the second group of layers under the control of a second set of recoating parameters that is different from the first set.

A fifth aspect of the invention provides an apparatus for implementing the method of the second aspect noted above Additional aspects of the invention will be clear from the embodiments of the invention described below in conjunction with the Figures associated therewith. Further aspects of invention involve the practice of the above referred to aspects of the invention in combination with one another.

DESCRIPTION OF PREFERRED
EMBODIMENTS OF THE INVENTION

Figure 1A:
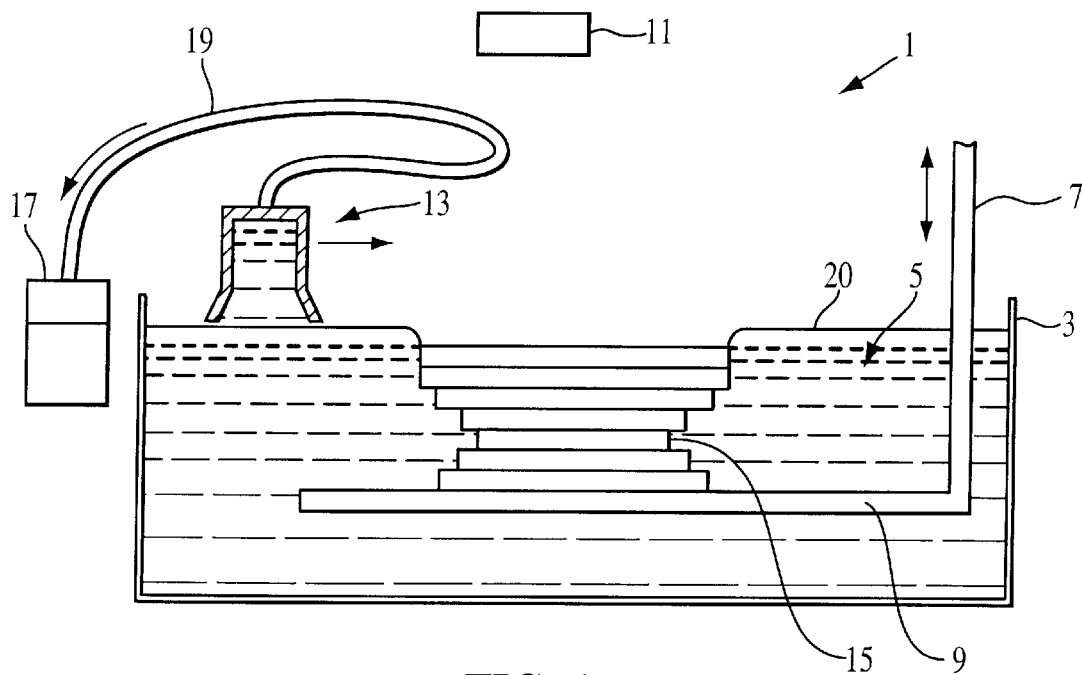
FIGS. 1a and 1b depict side views of a stereolithography apparatus for practicing the instant invention.
Figure 1B:
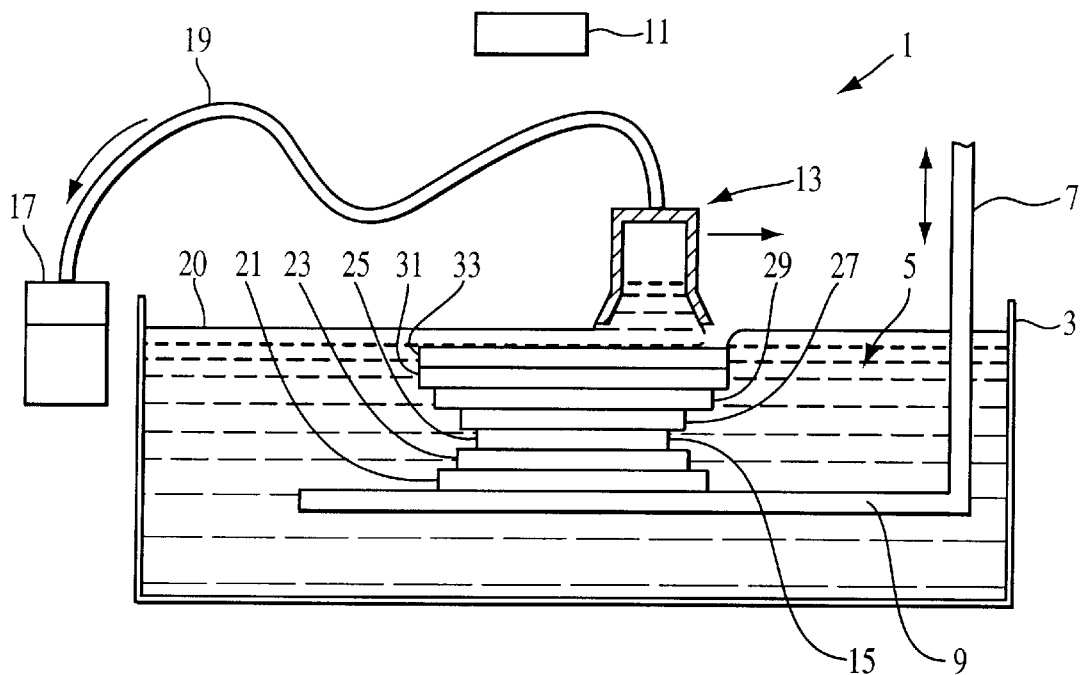

FIGS. 1a and 1b depict schematic representations of a preferred stereolithography apparatus 1 (SLA) for use with the instant invention. The basic components of an SLA are described in U.S. Pat. Nos. 4,575,330; 5,184,307; and 5,182,715 as referenced above. The preferred SLA includes container 3 for holding building material 5 (e.g. photopolymer) from which object 15 will be formed, elevator 7 and driving means (not shown), elevator platform 9, exposure system 11, recoating bar 13 and driving means (not shown), at least one computer (not shown) for manipulating object data (as needed) and for controlling the exposure system, elevator, and recoating device.

FIG. 1a depicts the partially formed object as having its most recently formed lamina lowered to a position approximately one layer thickness below the desired level of the upper surface of the building material 5 (i.e. desired working surface). As the layer thickness is small and the building material very viscous, FIG. 1a indicates that the material has not flowed significantly across the last formed lamina even after lowering the platform 9. FIG. 1b depicts the coating bar 13 as being swept part way across the previously formed lamina and that the next layer of building material has been partially formed.

A preferred exposure system is described in several of the patents and applications referenced above including U.S. Pat. Nos. 5,058,988; 5,059,021; 5,123,734; 5,133,987; 5,840,239; 09/248,352, and 09/247,120. This preferred system includes a laser, a beam focusing system, and a pair of computer controlled XY rotatable scanning mirrors of either the motor driven or galvanometer type.

Preferred control and data manipulation systems and software are described in a number of the patents referenced above, including U.S. Pat. Nos. 5,184,307; 5,321,622; and 5,597,520.

A preferred recoating device is described in U.S. Pat. No. 5,902,537 as referenced above and includes recoater bar 13, regulated vacuum pump 17, and vacuum line 19 connecting the bar 13 and the pump 17.

Other components of a preferred SLA (not shown) may include a liquid level control system, a build chamber, an environmental control system including a temperature control system, safety interlocks, a viewing device, and the like.

SLAs on which the instant invention can be utilized are available from 3D Systems, Inc. of Valencia, Calif. These SLAs include the SLA-250 system using a CW HeCd laser operating at 325 nm, the SLA-3500, SLA-5000, and the SLA 7000 system using a solid state lasers operating at 355 nm with a pulse repetition rates of 22.2 KHz, 40 KHz, and 25 KHz, respectively. Preferred building materials are photopolymers manufactured by CIBA Specialty Chemicals of Los Angeles, Calif., and are available from 3D Systems, Inc. These materials include SL 5170, SL 5190, and SL 5530HT.

The typical operation of an SLA involves alternating formation of coatings of material (i.e. layers of material) and the selective solidification of those coatings to form an object from a plurality of adhered laminae. The process may conceptually be viewed as beginning with the elevator platform 9 immersed one-layer thickness below the upper surface 20 of the photopolymer 5. The coating of photopolymer is selectively exposed to prescribed stimulation (e.g. a beam of UV radiation) which cures the material to a desired depth to form an initial lamina of the object adhered to the elevator platform. This initial lamina corresponds to an initial cross-section of the object to be formed or corresponds to an initial cross-section of supports that may be used to adhere the object to the platform. After formation of this initial lamina, the elevator platform and adhered initial lamina are lowered a net amount of one layer thickness into the material.

Hereinafter, layer thickness and other units of distance may be expressed in any of three units: (1) inches, (2) milli-inches (i.e. mils), or (3) millimeters. As the material is typically very viscous and the thickness of each layer is very thin (e.g. 4 mils to 10 mils), the material may not readily form a coating over the last solidified lamina (as shown in FIG. 1a). In the case where a coating is not readily formed, a recoating device may be swept at or somewhat above the surface of the building material (e.g. liquid photopolymer) to aid in the formation of a fresh coating. The coating formation process may involve the sweeping of the recoating bar one or more times at a desired velocity.

After formation of this coating, the second layer is solidified by a second exposure of the material to prescribed stimulation according to data representing a second cross-section of the object. This process of coating formation and solidification is repeated over and over again until the object is formed from a plurality of adhered layers (21, 23, 25, 27, 29, 31, and 33).

In some building techniques, incomplete solidification of some or all object cross-sections may occur. In some processes an object lamina associated with a given layer (i.e. a lamina whose location should be positioned, relative to the rest of the object, at the level corresponding to that layer of material) may not be exposed or may be only partially exposed in association with that layer (i.e. when that layer is located at the surface of the liquid). Instead, that lamina may be formed in whole or in part in association with a subsequently formed layer wherein the exposure applied to this subsequent layer is such as to cause material transformation to such an extent as to cause solidification in the material at the level of the associated cross-section. In other words, the layer which is associated with a given lamina may not be the layer in association with which the lamina will be solidified. It may be said that the layer in association with which a lamina or portion of a lamina is formed, is that layer which is located at the surface of material at the time the lamina is solidified. The layer with which a lamina is associated, is that layer which corresponds to the dimensionally correct location of the lamina relative to the rest of the object.

U.S. Pat. No. 5,902,538 provides exposure techniques and recoating techniques for use in forming objects with higher resolution than typically thought possible using a building material that has a minimum recoating depth (MRD) which is greater than the resolution desired. In this context, MRD may be considered the depth of coating that must be formed in order to form reliable or timely coatings of material over completely solidified laminae or cross-sections of the object. If only portions of the cross-sections are formed, it may be possible to form reasonably reliable coatings having thicknesses less than the MRD. Preferred embodiments disclosed in this referenced application are based on the recognition and exploitation of this phenomena.

Furthermore, the preferred embodiments in the U.S. Pat. No. 5,902,538 application achieve simplified data processing by utilizing predefined layer levels (e.g. vertical levels when layers are formed horizontally) for implementing variations in build parameters that will be used in forming the objects. These predefined levels may be (1) independent of object location (e.g. vertical location), (2) based on the location of the first layer of the object, or (3) based on the location of a particular vertical location of an object feature.

Figure 2A:
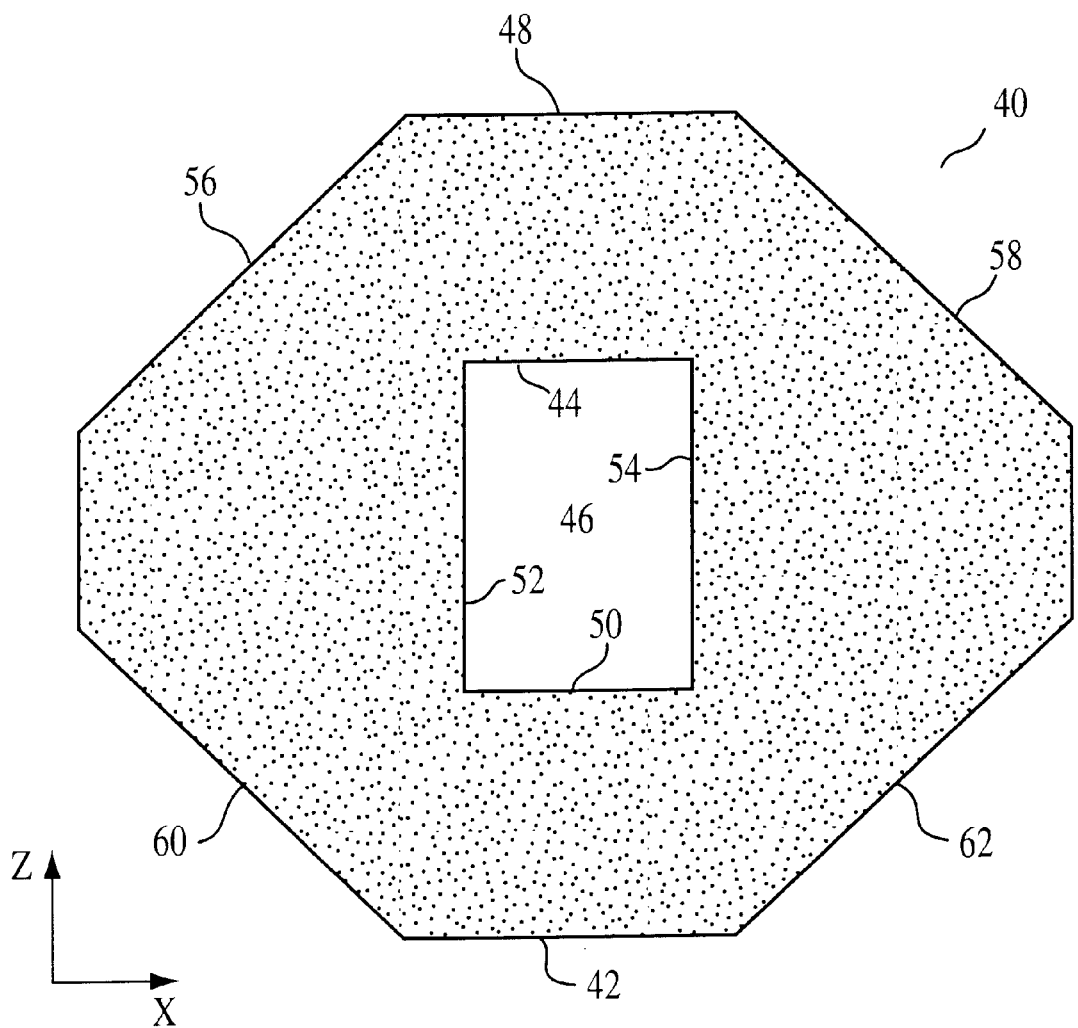
FIG. 2a depicts a side view of an object to be formed using stereolithography

FIG. 2a depicts a side view of an object 40 to be produced stereolithographically. In terms of forming horizontal layers, this figure depicts the vertical axis (Z) and one of the horizontal axes (X). This object will be used to illustrate some aspects of a preferred embodiment and alternative embodiment of the instant invention. This object includes two horizontal (i.e. flat) down-facing features: one at the bottom 42 of the object and the other at the upper edge 44 of the hole 46 through the middle of the object. Similarly, this object includes two horizontal (i.e. flat) up-facing features: one at the top 48 of the object and the other at the lower edge 50 of the hole 46 through the middle of the object. This object includes two vertical walls 52 and 54 located on either side of hole 46. This object also includes two non-horizontal (sometimes called, near flat) up-facing regions 56 and 58 located on either side of the object and two non-horizontal down-facing regions 60 and 62 located on either side of the object.

Figure 2B:
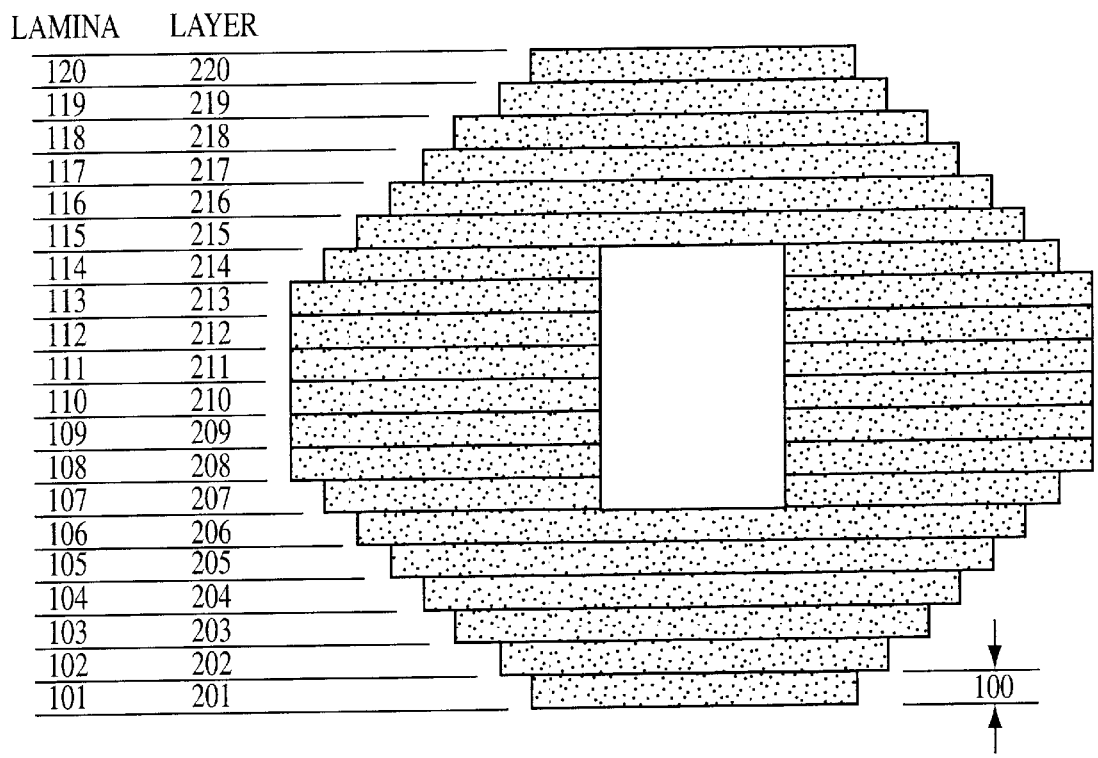
FIG. 2b depicts a side view of the object of FIG. 2a formed using a strict layer-by-layer build up technique.

FIG. 2b illustrates the object as it might be formed with a desired resolution using stereolithography wherein the MSD and MRD (discussed in U.S. Pat. Nos. 5,597,520 and 5,902,538 of the material are both less than or equal to the desired layer thickness (i.e. resolution). In this example, the thickness 100 of each layer is the same. As indicated, the object is formed from 20 adhered laminae 101–120 and 20 associated layers of material 201–220. As layers are typically solidified from their upper surface downward, it is typical to associate cross-sectional data, lamina and layer designations with the upper extent of their positions. To ensure adhesion between laminae, at least portions of each lamina are typically provided with a quantity of exposure that yields a cure depth of more than one layer thickness. In some circumstances use of cure depths greater than one layer thickness may not be necessary to attain adhesion. To optimize accuracy it is typical to manipulate the object data to account for an MSD greater than one layer thickness or to limit exposure of down-facing regions so that they are not cured to a depth of more than one layer thickness.

A comparison of FIGS. 2a and 2b indicates that the object as reproduced in this example is oversized relative to its original design. Vertical and Horizontal features are positioned correctly; but those features which are sloped or near flat (neither horizontal nor vertical), have solidified layers whose minimal extent touches the envelope of the original design and whose maximum extent protrudes beyond the original design. Further discussion of data association, exposure, and sizing issues can be found in U.S. Pat. Nos. 5,184,307 and 5,321,622 as well as a number of other patents referenced above.

Figure 2C:
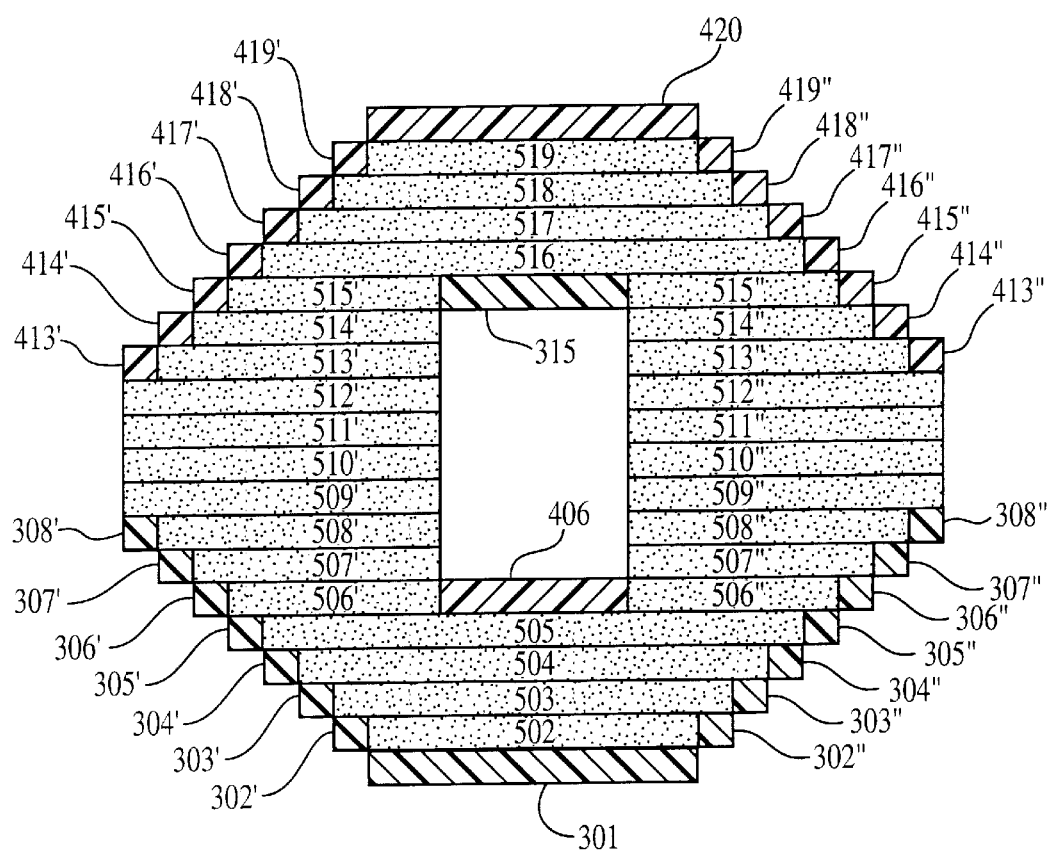
FIG. 2c depicts a side view of the object of FIG. 2b where the different exposure regions associated with each layer are depicted.

FIG. 2c depicts the object as produced in FIG. 2b but with various regions of the object and object laminae distinguished. In one classification scheme (as described in U.S. Pat. No. 5,321,622) each lamina of the object can be made up of one, two or three different regions: (1) down-facing regions; (2) up-facing regions, and (3) continuing regions (i.e. regions that are neither down-facing nor up-facing). In this scheme, the following eight vector types might be utilized though others may be defined and used:

Down-facing boundaries—Boundaries that surround down-facing regions of the object.

Up-facing boundaries—Boundaries that surround up-facing regions of the object.

Continuing boundaries—Boundaries that surround regions of the object that are neither up-facing nor down-facing Down-facing Hatch—Lines of exposure that are positioned within the down-facing boundaries. These lines may be closely or widely spaced from one another and they may extend in one or more directions.

Up-facing Hatch—Lines of exposure that are positioned within the up-facing boundaries. These lines may be closely or widely spaced from one another and they may extend in one or more directions.

Continuing Hatch—Lines of exposure that are positioned within continuing boundaries. These lines may be closely or widely spaced from one another and they may extend in one or more directions.

Down-facing Skin/Fill—Lines of exposure which are positioned within the down-facing boundaries and closely spaced so as to form a continuous region of solidified material.

Up-facing Skin/Fill—Lines of exposure which are positioned within the up-facing boundaries and closely spaced so as to form a continuous region of solidified material.

Taken together, the down-facing boundaries, down-facing hatch, and down-facing fill define the down-facing regions of the object. The up-facing boundaries, up-facing hatch, and up-facing fill, define the up-facing regions of the object. The continuing boundaries and continuing hatch define the continuing regions of the object. As down-facing regions have nothing below them to which adhesion is desirably achieved (other than possibly supports), the quantity of exposure applied to these regions typically does not include an extra amount to cause adhesion to a lower lamina though extra exposure might be given to appropriately deal with any MSD issues that exist. As up-facing and continuing regions have solidified material located below them, the quantity of exposure applied to these regions typically includes an extra amount to ensure adhesion to a lower lamina.

Table 2 outlines the different regions found on each lamina for FIG. 2c as based on the layer and lamina designation of FIG. 2b.

TABLE 2

Object Regions Existing on Each Lamina of FIG. 2c

| Lamina & Layer | Down-Facing Region(s) | Up-Facing Region(s) | Continuing Region(s) |
| --- | --- | --- | --- |
| 101, 201 | 301 | | |
| 102, 202 | 302', 302" | | 502 |
| 103, 203 | 303', 303' | | 503 |
| 104, 204 | 304', 304' | | 504 |
| 105, 205 | 305', 305" | | 505 |
| 106, 206 | 306', 306" | 406 | 506', 506" |
| 107, 207 | 307', 307" | | 507', 507" |
| 108, 208 | 308', 308" | | 508', 508" |
| 109, 209 | | | 509', 509" |
| 110, 210 | | | 510', 510" |
| 111, 211 | | | 511', 511" |
| 112, 212 | | | 512', 512" |
| 113, 213 | | 413', 413" | 513', 513" |
| 114, 214 | | 414', 414" | 514', 514" |
| 115, 215 | 315 | 415', 415" | 515', 515" |
| 116, 216 | | 416', 416" | 516 |
| 117, 217 | | 417', 417" | 517 |
| 118, 218 | | 418', 418" | 518 |
| 119, 219 | | 419', 419" | 519 |
| 120, 220 | | 420 | |

Other schemes for region identification and vector type creation are described in various patents and applications referenced above, including U.S. Pat. Nos. 5,184,307; 5,209,878; 5,238,639; 5,597,520; 5,902,538; 5,913,235 and, application Ser. No. 08/855,125; and. Some schemes might involve the use of fewer designations such as: (1) defining only outward facing regions and continuing regions where down-facing and up-facing regions are combined to form the outward facing regions; (2) combining all fill types into a single designation; or (3) combining up-facing and continuing hatch into a single designation or even all three hatch types into a single designations. Other schemes might involve the use of more designations such as dividing one or both of the up-facing and down-facing regions into flat regions and near-flat regions.

Other region identifications might involve the identification of which portions of boundaries regions associated with each lamina are outward facing and/or interior to the lamina. Outward facing boundary regions are associated with the Initial Cross-Section Boundaries (ICSB). The ICSB may be considered the cross-sectional boundary regions existing prior to the cross-sections into the various desired regions. ICSBs are described in U.S. Pat. Nos. 5,321,622 and 5,597,520. Interior boundaries are bounded on both sides by object portions of the lamina whereas outward boundaries are bounded on one side by an object portion of the lamina and on the other side by a non-object portion of the lamina.

Objects formed using the coating techniques of preferred embodiments of the instant invention use layer formation techniques analogous to those used in U.S. Pat. No. 5,902,538. Layers are preferably solidified according to primary and secondary layer criteria which may be based on MRD limitations or other reasons (e.g. to form bulk regions using thicker layers to enhance the green strength of the object as individual lamina are added) for using an analogous build style.

Depending on the MRD of the material used in forming the object of FIG. 2c, the object may not be reproducible with a finer resolution than that depicted. If the MRD is larger than layer thickness 100 (FIG. 2b), it would not be possible to reproduce this object with the resolution as depicted in FIG. 2b. However, according to the teachings of the U.S. Pat. No. 5,902,538, such reproduction would be possible as the building techniques deviate from the strict formation of each complete lamina in association with the layer with which it is associated.

Figure 2D:
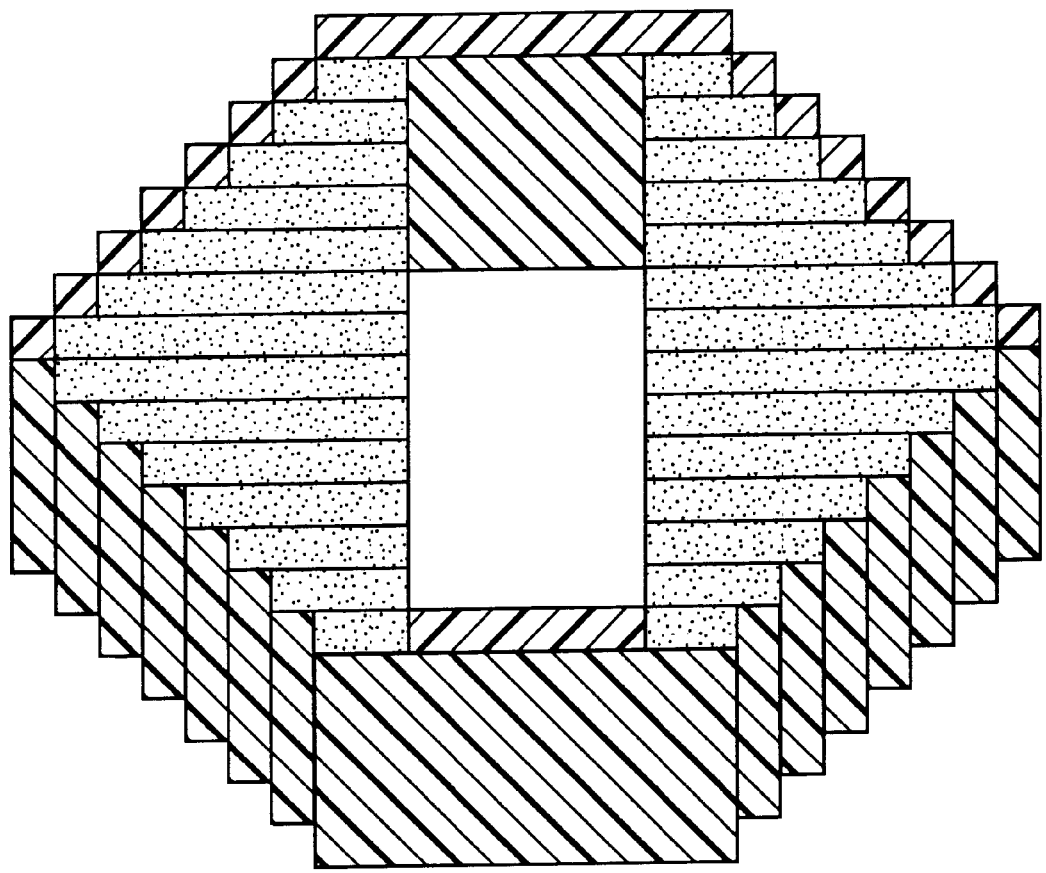
FIG. 2d depicts a side view of the object of FIG. 2a where a minimum solidification depth is considered to be five layer thicknesses.

The building techniques utilized in the preferred embodiments of the instant invention may accommodate for a minimum solidification depth (MSD) that is greater than one layer thickness. In some embodiments it is preferred that the MSD correction factor be at least as large as the MRD factor utilized. FIG. 2d illustrates an object formed with an MSD value equal to five layer thicknesses. Data for producing the depicted object may be derived from the data of FIGS. 2a–2c in combination with the teachings of U.S. Pat. No. 5,597,520. According to these teachings an object may be formed with high resolution by relatively pushing the downfacing features associated with laminae, as depicted in FIG. 2b, up into higher layers and removing initial cross-sectional data associated with the layers through which the downfacing regions have been shifted. Since all down-facing regions must be solidified to a depth of at least five layer thicknesses, each is pushed up from its originally associated layer and lamina so that it is associated with both its original lamina and layer as well as the next higher four laminae and layers and so that it is formed in association with the next higher lamina. As with FIG. 2c, regions depicted with diagonal lines running from upper left to lower right are down-facing regions. Regions depicted with hatching running from upper right to lower left are up-facing and regions depicted with a solid background and without hatching are continuing regions.

Figure 3:
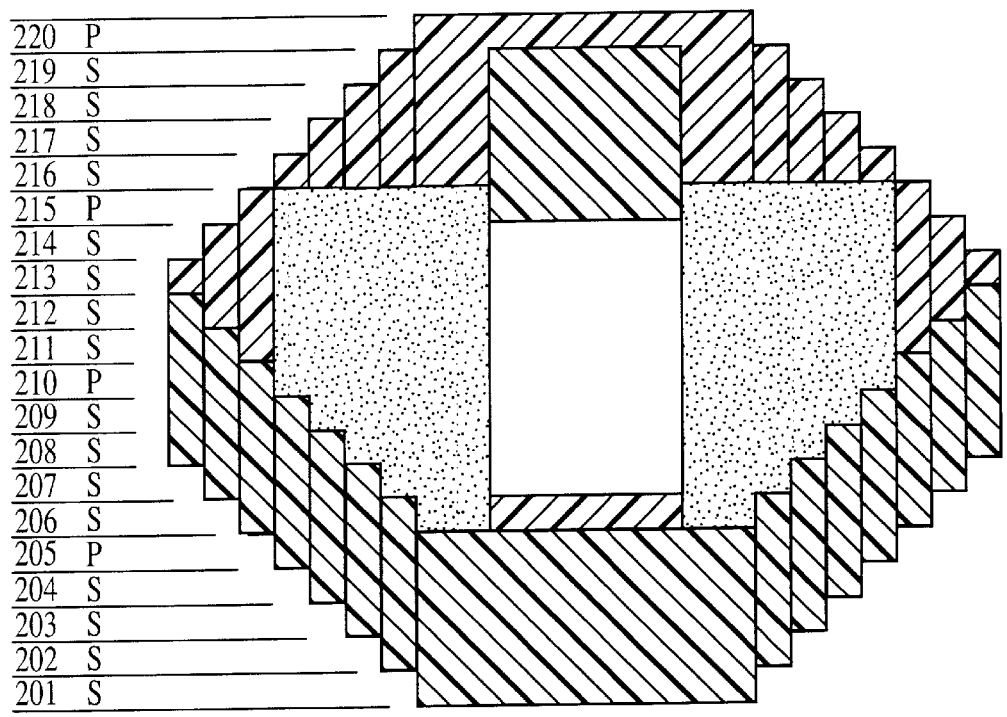
FIG. 3 depicts a side view of an object formed with primary and secondary layers and wherein four secondary layers exist between pairs of successive primary layers.

An example of an exposure technique that uses primary and secondary layer designations is provided in FIG. 2d. This Figure depicts an object formed using an MSD value of 5 layer thickness as well as an MRD value of 5 layer thicknesses (the MRD may be based on a physical minimum recoating depth or may alternatively be a variable that is used to cause object formation according to analogous exposure criteria). The object is formed according to the primary and secondary layer designations provided in FIG. 3 wherein "P" indicates the layer is a primary layer and "S" indicates that the layer is a secondary layer.

In the context of the present invention primary layers may be considered those layers that have a majority of their associated lamina formed in association with those layers. It is more preferred that the primary lamina be substantially formed in association with their respective layers. The secondary layers may be considered as those layers whose lamina have no more than minority portions of at least continuing regions formed in association with their respective layers. In an alternative definition, primary and secondary may be labels placed on layers, regardless of the extent of lamina formation that will occur in association with each layer, where the primary layers may be used as periodic levels at which to correct recoating errors may have been building up as a result of inadequate coating parameters used in forming the secondary layers.

According to a first preferred embodiment of the present invention individual layers of the object will be divided into groups for allocation of recoating parameters. In this regard layers may be placed into sets and groups. Even super-sets and super-groups may be defined.

Sets of layers may be considered as series of consecutive layers, where certain features of individual layers in each set are repeated in successive sets. A set of layers may be defined as including a single primary layer and a number of secondary layers equivalent to the number existing between the successive primary layers.

Using such a definition, a number of sets may be defined in a number of ways. For example, the secondary layers in a set may all be located below the primary layer of the set. This may be illustrated by considering two sets extractable from FIG. 3: (1) layers 201–205, and (2) 206–210. As a second example, secondary layers may be located above the primary layer that is included in the set. This may be illustrated by considering two sets extractable from FIG. 3: (1) layers 205–209, and layers 210–214. As a third example, some of the secondary layers may be below the primary layer that is included in the set while the others may be above it. This may be illustrated by considering two sets of extractable from FIG. 3: (1) layers 203–207, and (2) layers 204–212.

Supersets of layers may consist of two or more sets. These supersets may be useful in defining complex recoating parameters that will be repeated but not necessary with each set. Instead the repetition may occur after formation of two or more sets. Of course, other set definitions are possible, as well as super-set definitions and even higher order set definitions.

In a preferred embodiment and in terms of defining layers in sets, recoating parameters will be varied between some of the layers within the set while the recoating parameters will be the same for analogous layers in two different sets. For example, if set 1 includes layers 201–205 and set 2 includes 206–210, layers 201 and 206 would be considered analogous layers as they hold the same positions relative to their respective primary layers. Similarly layers 202 and 207, 203 and 208, 204 and 209, and 205 and 210 would also be analogous.

A different way of looking at layers is to place analogous layers in each set or super-set into groups. Alternatively, a plurality of layers in individual sets may be used in forming groupings. For example, primary layers may be considered as one group. The first secondary layers below the primary layers may be considered as a second group, while the secondary layers; immediately above the primary layers may be considered a third group. Another example might include both the primary layers and a single secondary layer that immediately follows the primary layer as belonging to a first group while the remaining secondary layers may form a second group.

In general recoating parameters may be specified on a group by group basis. These recoating parameters may be the same for each group or may be different between one or more groups or even between all groups. The number of groups may be equal to the number layers forming a set or super-set. Alternatively, the number of groups may be less than the number of layers in a set (e.g. two or more). In some circumstances the number of grouping is preferably three or more.

Groupings may be based on how acceptable recoating parameters generally vary with distance or number of layers separating the layer to be coated from a previously formed primary lamina or subsequent primary lamina to be formed. As an example, the primary layers may form a first grouping as certain recoating parameters may want to be used to ensure that a good coating is formed so that a reasonable lamina is formed. One or more secondary layers immediately above the primary laminae may be form a second group as it may be desirable to use coating parameters that are appropriate for forming coatings over large solidified regions. One or more secondary layers immediately preceding a primary layer may form a third group as it may be desirable to use special recoating parameters that set the stage for forming the subsequent primary lamina or simply because the coating depth over the previous primary lamina is growing. A fourth grouping, or even multiple additional groupings, may be defined intermediate to the second and third groupings based on a desire to vary the coating parameters. For each of the groupings the coating parameters may be varied to improve coating formation and/or to save time.

Use of layer groupings allow the build time to be decreased and/or coating quality to be enhanced. These benefits may be obtained by allowing critical layers to be given adequate time, sweep speeds, etc. to form desired coatings without burdening the other groups with excessive or inappropriate coating parameters and without burdening an operator with specifying coating parameters for each and every one of the hundreds or thousands of layers from which the part will be formed.

A first preferred embodiment of the present invention provides sets with "S" layers each where "S" is set to five (one primary layer and four secondary layers) and different coating parameters specifiable for "M" groups of layers where "M" is set to three. That is, the first preferred embodiment associates three sets of coating parameters with each set of five layers.

In this embodiment, the first group of layers contains the primary layers. The second group of layers includes N secondary layers, where N is set to two. These N secondary layers are located immediately preceding the primary layers of the first group. The maximum value of N is less than or equal to the number of secondary layers in each set. Any remaining secondary layers in each set are treated as belonging to a third group.

This first embodiment forms objects using a 1 mil (25 micron) layer thickness with every fifth layer being a primary layer. On secondary layers only boundaries and up-facing and down-facing regions are formed. On primary layers boundaries, up-facing regions, down-facing regions and continuing regions (e.g. continuing hatch) are formed using sufficient exposure to cause solidification in the preceding secondary layers and adhesion to the lamina formed in association with the preceding primary layer. Some preferred recoating parameters for this first embodiment are depicted in Table 3. These parameters include the number of sweeps that the recoater is to make when forming a coatings for each group of layers, the speed at which the recoater sweeps, the clearance between the bottom of the recoater and the last solidified lamina during sweeping, the Z-wait (i.e. delay that exists between the completion of sweeping and the beginning of the next exposure), and the predip delay (i.e. the time between completing exposure and beginning the recoating process).

TABLE 3

Preferred Recoating Parameters for each Group of Layers in the First Preferred Embodiment:

| Recoating Parameter | Group 1 - Value | Group 2 - Value | Group 3 - Value |
|---|---|---|---|
| Sweeps of Recoater | 1 | 1 | 1 |
| Sweeping speed | 2 in/sec | 2 in/sec | 2 in/sec |
| Clearance | 9*LT | 9*LT | 9*LT |
| Z-wait | 0 | 40 | 40 |
| Predip Delay | 0 | 0 | 0 |

As can be seen in this embodiment only the Z-wait is varied for one of the groups of layers. Without this single variation the formation time for each group of five layers would increase by 40 seconds and as such the build time for formation of a 1 inch object would increase by 8000 seconds or 2.2 hours (40 seconds * 200 groups/inch). If the object were 10 inches in height the savings would be 22 hours. In other words almost a full day could be cut from the object formation time. Even more drastic savings can result in situations where longer Z-waits are needed for some layers or further sweeps are needed for some layers but not others, etc. These example illustrates the enhancement to the object formation process allowed by allowing the specification of coating parameters based on individual interlaced groups of layers.

It is preferred that one or more of these parameter values, and potentially other recoating parameters as well, be enterable into a memory for use by the computer in forming objects without the operator needing to enter these parameters more than once. It is more preferred that appropriate values for at least one of these and probably other parameters be entered into a recoating style file that will be used in controlling the recoating process. This style file may be selected manually by a user or more preferably by answering a few basic questions about the desired build process from which the control computer or other computer will automatically select the appropriate style file to use in forming the object. Association of style files with objects is discussed further in U.S. patent application No. 09/247,119 filed Feb. 8, 1999.

In alternative embodiments various modification to the above embodiment may be made: (1) different numbers of layers may be included in the second group (N may take on a value of 1, 3, or 4); (2) the sets may comprises a different number of layers than 5 (e.g. 2, 3, 4, 6–10 or even more); (3) some sets may include different numbers is of layers as compared to other sets; (4) super-sets may be defined and grouping based thereon; (5) fewer or more recoating parameters may be specified and varied between groups; (6) the layer thickness may vary (e.g. 5 microns, 10 microns, 0.5 mils, 20 microns, 2 mils, etc); (7) The area of exposure on primary layers and secondary layers may be different than that described in the first embodiment. In fact, the recoating technique of the present invention may be utilized with a normal lamina-by-lamina build up process wherein for some reason it is decided that variable recoating over sets of layers would be useful.

For different build parameters such as layer thickness, exposure style, number of layers per set, resin type, etc. preferred recoating parameters can be empirically determined by those of skill in the art by building test objects with different coating parameters determining which parameters are most appropriate for each group so that build time is reduced and or the quality of the coatings is improved.

Implementation of the methods described herein to form apparatus for forming objects according to the teachings herein can be implemented by programming an SLA control computer, or separate data processing computer, through software or hard coding to allow entry of desired parameters into the system and use of those parameters by the system.

Methods and apparatus in any embodiment can be modified according to the alternative teachings explicitly described above. Furthermore, the methods and apparatus in these embodiments and their alternatives can be modified according to various teachings in the above incorporated patents and applications.

Though a particular embodiment has been described and illustrated and several alternatives proposed, many additional embodiments and alternatives will be apparent to those of skill in the art upon review of the teachings herein. As such, these embodiments are not intended to limit the scope of the invention, but instead to be exemplary in nature.

We claim:

1. A method of forming a three-dimensional object from a plurality of adhered laminae, comprising:

forming successive layers of material adjacent to any last formed layers of material in preparation for forming subsequent laminae of the object, some of the successive layers being primary layers spaced one from the other by one or more secondary layers positioned intermediate thereto;

defining at least first and second groups of layers, wherein the first group comprises a plurality of primary layers and the second group comprises one or more secondary layers located between the pair of successive primary layers in the first group;

selectively exposing the primary layers to form at least majority portions of primary laminae in association therewith and to form at least portions of the secondary laminae; and selectively exposing the secondary layers to form at least minority portions of the secondary laminae in association therewith;

wherein the exposure of the primary layers and secondary layers results in adhesion of laminae to previously formed laminae so as to form the object from a plurality of adhered laminae;

wherein the formation of the first group of layers is controlled by a first set of recoating parameters and the formation of the second group of layers is controlled by a second set of recoating parameters that is different from the first set.

2. The method of claim 1 wherein at least a third group of layers comprises one or more secondary layers that are not in the second group but which are located intermediate to the primary layers in the first group, and wherein at least a third set of recoating parameters is applied during formation of the layers included in the at least third group.

3. The method of claim 2 wherein the at least third group comprises at least a third group and a fourth group wherein the third set of recoating parameters is used in forming the layers in the third group and a fourth set of recoating parameters is used in forming the layers of the fourth group.

4. The method of claim 2 wherein the at least third group comprises at least a third group, a fourth group, and a fifth group and wherein the third set of recoating parameters is used in forming the layers in the third group, a fourth set of recoating parameters is used in forming the layers of the fourth group, and a fifth set of recoating parameters is used in forming the layers of the fifth group.

5. The method of claim 1 wherein the same number of secondary layers exist between each pair of successive primary layers.

6. The method of claim 1 wherein a different number of secondary layers exist between a first pair of successive primary layers and a second pair of successive primary layers.

7. The method of claim 2 wherein the second group of layers includes a single secondary layer located between each pair of successive primary layers and wherein at least one additional secondary layer exists between at least some of the successive primary layers.

8. The method of claim 2 wherein the second group of layers includes two or more consecutive secondary layers located between each pair of successive primary layers.

9. The method of claim 2 wherein the at least third group of layers includes a single secondary layer that is located between two successive primary layers.

10. The method of claim 2 wherein the at least third group of layers includes two or more consecutive secondary layers located between each pair of successive primary layers.

11. The method of claim 2 wherein the at least third set of recoating parameters is different from the first and second sets of recoating parameters.

12. The method of claim 1 additionally comprising sweeping a recoating device over at least some laminae during formation of at least some layers wherein the recoating parameters include one or more of (1) number of times the recoating device is to sweep, (2) speed for at least one sweep, (3) clearance between an upper surface of a last formed lamina and a bottom edge of the recoating device during sweeping, (4) a Z-wait between completion of sweeping and beginning exposure of the layer, and (5) a predip delay.

13. The method of claim 1 wherein a minimum number N of secondary layers exist between successive primary layers and the number of layers in the second group located between each pair of primary layers is specified by a number S, wherein is less than N, wherein layers in the second group immediately precede a primary layer.

14. A method of forming a three-dimensional object from a plurality of adhered laminae, comprising:

defining a number S of successive layers as a set;

defining a plurality of set of layers;

defining a plurality of groups of layers, wherein the groups contain one or more layers from each of the plurality of sets;

associating recoating parameters with each of the defined groups;

forming successive layers of material adjacent to any last formed layers of material in preparation for forming subsequent laminae of the object, wherein the recoating parameters utilized for forming a particular layer are dictated by recoating parameters specified for the group that contains the specific layer;

selectively exposing the layers to form at least portions of the lamina associated therewith to form the object from a plurality of adhered laminae.

15. An apparatus for forming a three-dimensional object from a plurality of adhered laminae, comprising:

means for forming successive layers of material adjacent to any previously formed layers of material in preparation for forming subsequent laminae of the object, some of the successive layers being primary layers spaced one from the other by one or more secondary layers positioned intermediate thereto;

means for defining at least first and second groups of layers, wherein the first group comprises a plurality of primary layers and the second group comprises one or more secondary layers located between successive pairs of primary layers;

means for selectively exposing the primary layers to form at least majority portions of primary laminae in association therewith and to form at least portions of the secondary laminae; and means for selectively exposing the secondary layers to form at least minority portions of the secondary laminae in association therewith;

wherein the exposure of the primary layers and secondary layers results in adhesion of laminae to previously formed laminae so as to form the object from a plurality of adhered laminae;

wherein the means for forming forms the first group of layers under the control of a first set of recoating parameters and forms the second group of layers under the control of a second set of recoating parameters that is different from the first set.

16. An apparatus for forming a three-dimensional object from a plurality of adhered laminae, comprising:

a coating system for forming successive layers of material adjacent to any previously formed layers of material in preparation for forming subsequent laminae of the object, some of the successive layers being primary layers spaced one from the other by one or more secondary layers positioned intermediate thereto;

a computer programmed to define at least first and second groups of layers, wherein the first group comprises a plurality of primary layers and the second group comprises one or more secondary layers located between pairs of successive primary layers;

an exposure system for selectively exposing the layers of material including exposing (1) the primary layers to form at least majority portions of primary laminae in association therewith and to form at least portions of the secondary laminae, and (2) the secondary layers to form at least minority portions of the secondary laminae in association therewith;

wherein the exposure of the primary layers and secondary layers results in adhesion of laminae to previously formed laminae so as to form the object from a plurality of adhered laminae;

wherein the coating system forms the first group of layers under the control of a first set of recoating parameters and forms the second group of layers under the control of a second set of recoating parameters that is different from the first set.

17. An apparatus for forming a three-dimensional object from a plurality of adhered laminae, comprising:

means for defining a number S of successive layers as a set;

means for defining a plurality of set of layers;

means for defining a plurality of groups of layers, wherein the groups contain one or more layers from each of the plurality of sets;

means for associating recoating parameters with each of the defined groups;

means for forming successive layers of material adjacent to any last formed layers of material in preparation for forming subsequent laminae of the object, wherein the recoating parameters utilized for forming a particular layer are dictated by recoating parameters specified for the group that contains the specific layer; and means for selectively exposing the layers to form at least portions of the lamina associated therewith to form the object from a plurality of adhered laminae.

* * * * *

UNITED STATES PATENT AND TRADEMARK OFFICE
CERTIFICATE OF CORRECTION

PATENT NO.   :  6,103,176
DATED        :  August 15, 2000
INVENTOR(S)  :  Nguyen et al.

Page 1 of 2

It is certified that error appears in the above-identified patent and that said Letters Patent are hereby corrected as shown below:

Column 2, Line 12    "WO 96-1260,7" should read --WO 96-12607--.

Column 2, Line 21    "et al. in U.S." should read "et al. and in U.S.".

Column 3, Line 29    "particularly curt type" should read --particularly curl type--.

Column 3, Line 42    "07/592,5599" should read --07/592,559--.

Column 7, Line 21    "Discloses stereolithographic portions of lamina" should read --Discloses stereolithographic techniques for forming objects using multiple sized beams including data manipulation techniques for determining which portions of lamina--.

Column 7, Line 30    "03/248,113" should read --09/247,113--.

Column 7, Line 44    "defray)." should read --delay).--.

Column 7, Line 50    "09/247,110" should read --09/247,119--.

Column 14, Line 28   "5,914,235" should read --5,943,235--.

UNITED STATES PATENT AND TRADEMARK OFFICE
CERTIFICATE OF CORRECTION

PATENT NO.   : 6,103,176
DATED        : August 15, 2000
INVENTOR(S)  : Nguyen et al It is certified that error appears in the above-indentified patent and that said Letters Patent is hereby corrected as shown below:

Column 20, Line 21 "wherein is less" should read --wherein S is less--

Signed and Sealed this

Seventeenth Day of April, 2001

Attest:

NICHOLAS P. GODICI

Attesting Officer

Acting Director of the United States Patent and Trademark Office